Aug. 7, 1956 — C. A. McCOMB — 2,757,729
APPARATUS FOR REMOVING BRAKE SHOE LININGS
Filed July 19, 1951 — 3 Sheets-Sheet 1
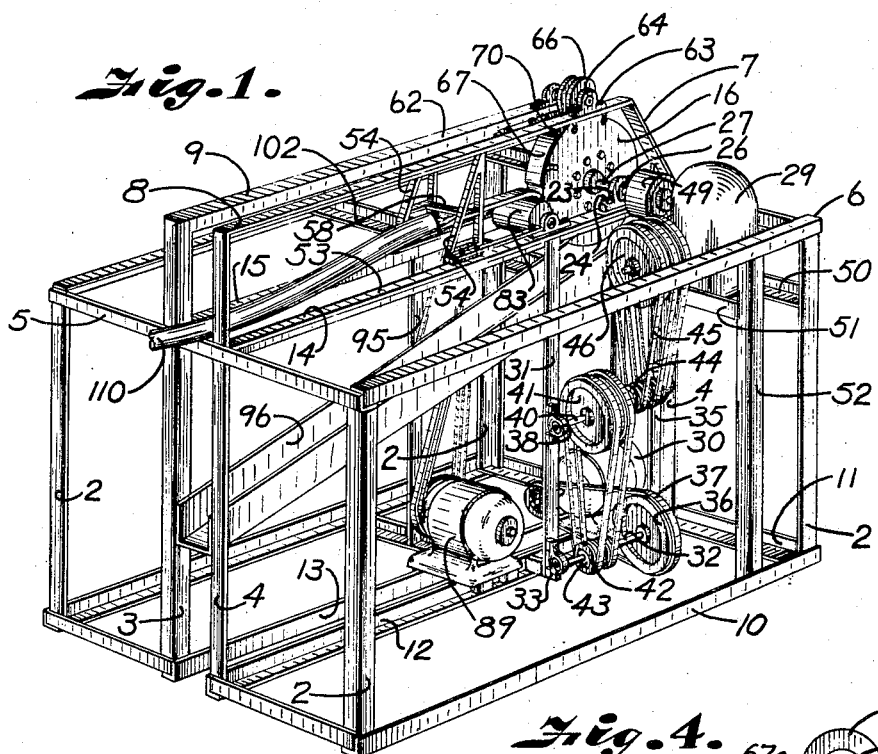
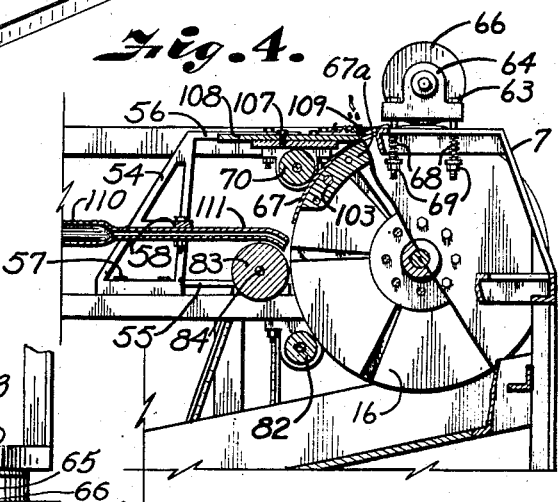
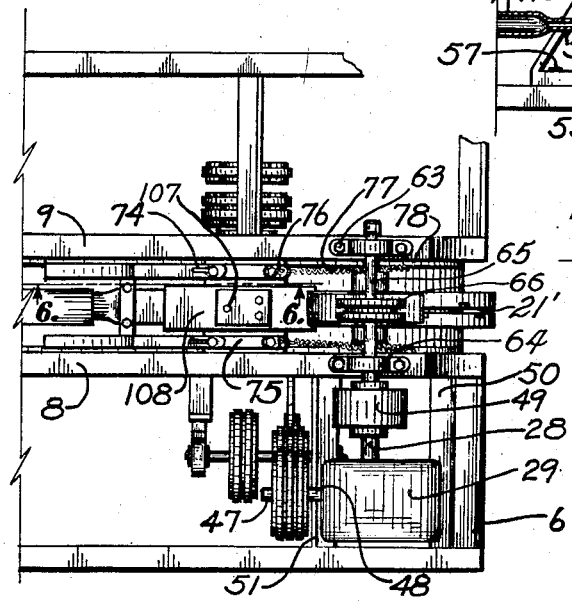
INVENTOR.
Claude A. McComb
BY
Fulburn Mullendore
ATTORNEYS.

Aug. 7, 1956     C. A. McCOMB     2,757,729
APPARATUS FOR REMOVING BRAKE SHOE LININGS
Filed July 19, 1951     3 Sheets-Sheet 2

INVENTOR.
Claude A. McComb
BY
ATTORNEYS.

Aug. 7, 1956   C. A. McCOMB   2,757,729
APPARATUS FOR REMOVING BRAKE SHOE LININGS
Filed July 19, 1951   3 Sheets-Sheet 3

INVENTOR.
Claude A. McComb
BY
ATTORNEYS.

United States Patent Office 2,757,729
Patented Aug. 7, 1956

2,757,729

APPARATUS FOR REMOVING BRAKE SHOE LININGS

Claude A. McComb, Kansas City, Mo., assignor to B-W Brake Company, Kansas City, Mo., a corporation of Missouri Application July 19, 1951, Serial No. 237,641

2 Claims. (Cl. 164—38)

This invention relates to apparatus for removing brake shoe linings, and more particularly to apparatus for cutting the lining from the brake shoe and polishing the same in one operation.

In present day practice there are two methods of fastening brake linings to brake shoes; one is by riveting, and the other by sealing the brake lining to the brake shoe with a bonding material by application of heat which seals the lining to the brake shoe very tightly and the lining is very difficult to be removed from the brake shoe after such application. The rivets are easily removed by knocking out the rivets but with bonded material a different problem is presented.

Heretofore, it has been the practice to burn the lining therefrom, but this is objectionable for the reason that heat is harmful to the metal of the brake shoe. Another method has been by grinding the lining and bonded material off by holding the brake shoe against an emery stone which is also very unsatisfactory due to unevenness in such grinding.

The principal objects of the present invention are to provide apparatus for removing linings from brake shoes which have been secured thereto by bonding material without distortion of the brake shoes so that they may be reused and reconditioning the shoe for reuse; to provide apparatus for holding the brake shoe and removing the lining therefrom by cutting action and simultaneously removing the bonding material therefrom and leaving a smooth surface for reapplication of linings to such shoes; and to provide improved elements and arrangement of elements in an apparatus of this character for removing linings from brake shoes, In accomplishing these and and other objects of the present invention, I have provided improved details of structure, the preferred forms of which are illustrated in the accompanying drawings, wherein:

Fig. 1 is a perspective view of my improved apparatus for removing linings from brake shoes.

Fig. 4 is an enlarged fragmentary cross-sectional view particularly illustrating the drum for supporting the brake shoe, the cutting knife, emery wheel, and pressure rollers for holding the brake shoe on the wheel as it is being processed through the apparatus.

Fig. 5 is a fragmentary top plan view of the apparatus.

Figure 2:
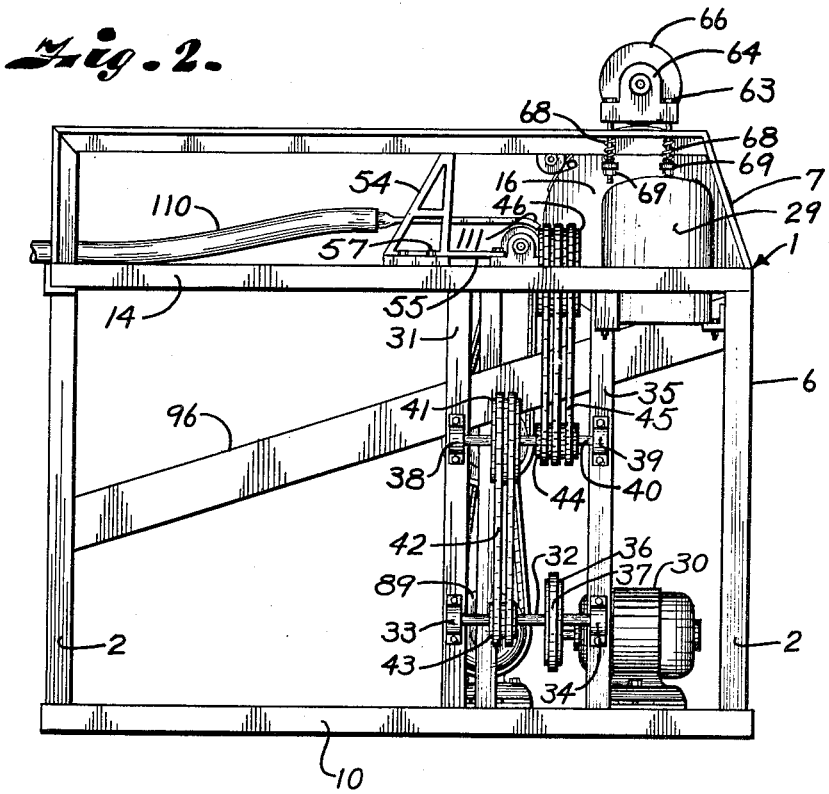
Fig. 2 is a side elevational view of my improved apparatus.

Referring more in detail to the drawings:

1 designates a frame for supporting my apparatus for removing brake linings comprising corner posts 2 and center spaced posts 3 and 4 at the respective ends, the rear posts of which extend above horizontal tie frame members 5 connecting the tops of the corner posts 2. The posts 3 and 4 above the frame 5 at the front end 6 of the structure are inclined rearwardly as indicated at 7 and are connected to the rear posts 3 and 4 by horizontal bars 8 and 9. The complete framework structure is preferably made of angle iron structure, and the lower posts are connected by bracing 10 and 11, and extending through substantially the center of the base are angle members 12 and 13, the rear ends being connected to the uprights 3 and 4.

Horizontal tie members 14 and 15 extend longitudinally through substantially the center at the upper portion of the frame and have their respective ends secured to the horizontal bars 5 for supporting a drum 16 near the front end 6 of the frame structure upon which the shoes are placed for removing the lining.

Figure 3:
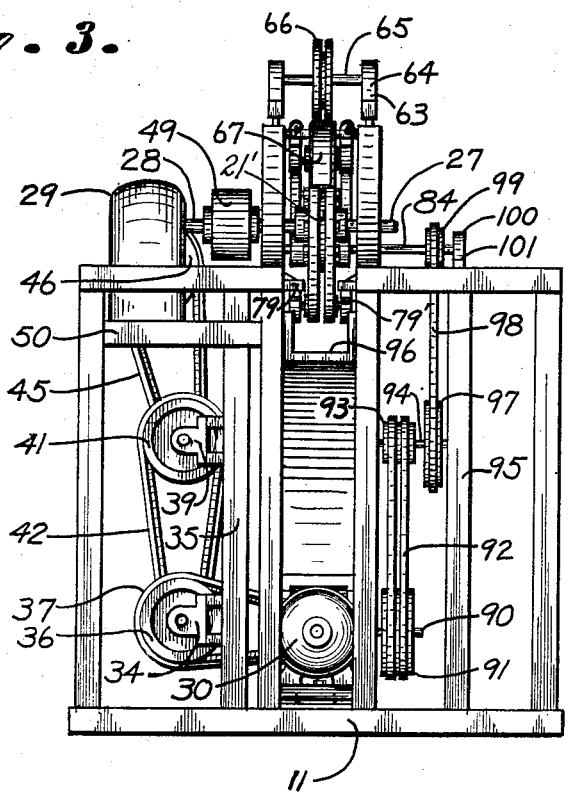
Fig. 3 is a front elevational end view thereof.
Figure 7:
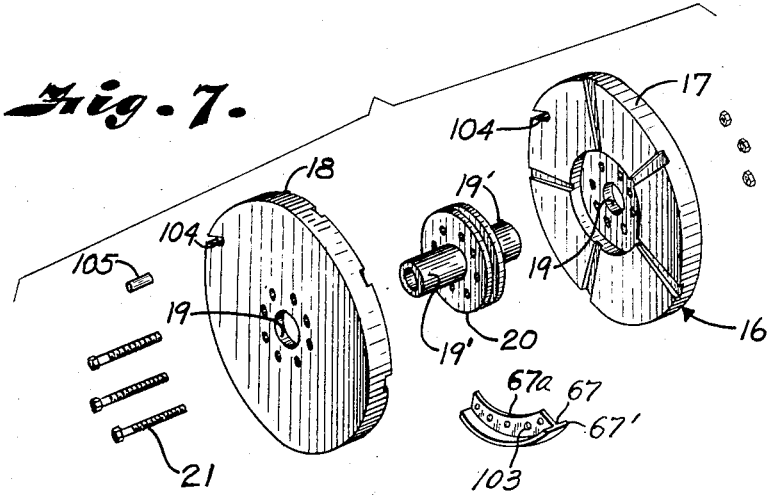
Fig. 7 is a perspective view of the parts of the drum which hold the brake shoe. The parts are shown in spaced relation.

The drum 16 is made of two wheels or cylindrical members 17 and 18 having center openings 19 adapted to engage upon a tubular member 19' having a central circular member 20 rigidly secured thereto. The wheels 17 and 18 are secured to the circular member 20 by bolts or the like 21 but are spaced apart as indicated at 21' (Fig. 3). Bracket 23 is mounted upon the horizontal member 14 by a bolt or the like 24. The bracket includes a bearing 26 for a shaft 27 extending through the tubular member 19'. Like brackets and bearings (not shown) are mounted on the horizontal member 15 to support the shaft 27 for rotatably mounting the drum 16 on the frame. The shaft 27 has an extension 28 leading to a gear reduction box 29.

A motor 30 is mounted upon the horizontal members 12 and 13 near the front 6 of the framework structure for operating the drum 16. An upright member 31 is mounted upon the horizontal member 12 and extends upwardly to the horizontal member 14 at the top of the frame and a shaft 32 is mounted in bearing brackets 33 on the upright member 31, and a bearing bracket 34 on an upright member 35. Mounted on the shaft 32 is a pulley 36 having belt connection 37 with the motor 30. Mounted on the standards 31 and 35 and spaced from the lower portion of the frame are bearing brackets 38 and 39 for a shaft 40 upon which are mounted pulleys 41 having belt connections 42 with smaller pulleys 43 on the shaft 32. Also mounted upon the shaft 40 are pulleys 44 having belt connections 45 with pulleys 46 mounted upon a shaft 47 having connection with the gear box 29 as indicated at 48. This combined wheel and pulley arrangement greatly reduces the speed of the gears in the gear reduction box which in turn also reduces the speed of rotation of the shaft 27 on which the drum 16 is mounted so that the drum rotates very slowly.

Also mounted upon the extension 28 of the shaft 27 is a torque coupling member 49 to prevent twisting and bending of the shaft 27 due to the heavy strain placed thereon by the cutter as will later be described.

The gear reduction box 29 is supported on the cross members 50 and 51 having their ends secured to the corner uprights and an upright 52 spaced therefrom as best illustrated in Figs. 1 and 2.

Figure 6:
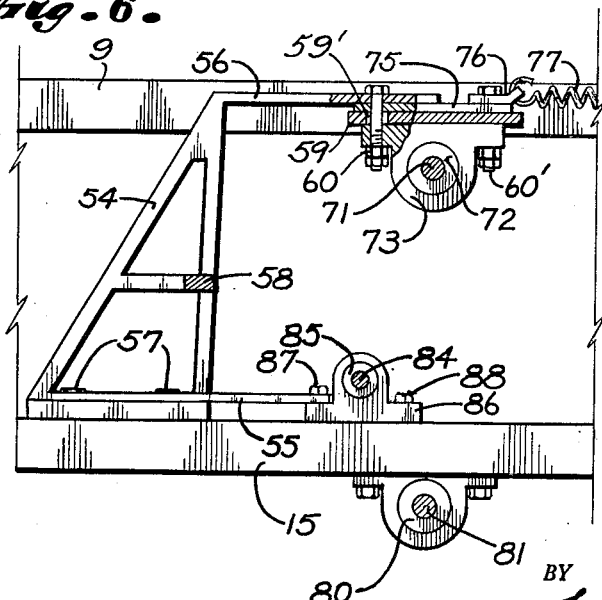
Fig. 6 is an enlarged fragmentary section particularly illustrating the frame upon which some of the pressure rollers and emery wheel are mounted, the section being taken on the line 6—6, Fig. 5.

The horizontal members 14 and 15 are angle shaped and slidingly mounted on the plane surfaces 53 thereof are A-shaped frame members 54 having arms 55 and 56 extending forwardly therefrom for a purpose later described. Openings (not shown) are provided in the plane surfaces 53 of the angle irons 14 and 15 and the A-frame is slidably secured thereto by bolts or the like 57. The A-frames are connected by a cross bar 58 (Fig. 6).

Rigidly secured to the horizontal arms 8 and 9 of the framework structure by welding or other suitable means is a cross plate 59 upon which is mounted by a plurality of set screws or the like 107 a knife 108 having a cutting edge 109 extending forwardly of the plate 59 to adjacent the drum 16.

Mounted upon the plane surfaces 62 of the arms 8 and 9 by bolts or the like 63 are bearing brackets 64 for a shaft 65 for mounting a roller 66 for exerting pressure upon a shoe 67 as it is rotated on the drum or shoe wheel 16. Springs 68 are provided between the flanges of the arms 8 and 9 and the nuts 69 of the bolts 63 for tensioning of the roller 66 against the shoe being worked upon. The shoe 67 has a body portion 67' curved to conform to the periphery of the drum 16 and has a flange or rib 67a adapted to engage in the space 21' when the shoe is on the drum 16.

A second pressure roller 70 is mounted upon a shaft 71 working in bearings 72 contained in brackets 73 secured on the underneath side of the cross plate 59 by bolts or the like 60 and 60'. The plate 59 is provided with slots 59' through which the bolts 60 and 60' extend. The forwardly extending arms 56 on the A-frame are provided with slots 74 through which the bolts 60 extend so that the bearing brackets 73 and the A-frames 54 are slidably mounted upon the main frame of the structure.

Secured to the bolts 60' above a plate 75 engaging between the cross member 59 and the forwardly extending arms 56 are lugs 76 having openings for receiving the ends of coil springs 77 extending forwardly and having their opposite ends engaged in openings 78 in the vertical portions of the rails 8 and 9, as best illustrated in Figs. 5 and 6 for spring urging the pressure roller 70 against the brake shoe when the device is in operation. Thus the A-frame 54 with its arms 55 and 56, plate 75 and lugs 76 on the bolts 60' are mounted for sliding movement on the horizontal members 14 and 15 and the cross plate 59 through connection of the bolts 60 and 60' in openings 59' of the cross plate through tension of the spring 77 to urge the roller against the drum 16.

Welded to the inside of the horizontal angle members 14 and 15 adjacent the shoe wheel 16 are brackets 79. Bearings 80 are bolted to these brackets as at 79' and hold a shaft 81 mounting a roller 82. The roller 82 is spaced from the drum 16 a sufficient distance for passing the shoe after it passes through the cutting and polishing mechanism.

Also slidably mounted on the horizontal portion of the angle members 14 and 15 is an emery wheel 83 carried by a shaft 84 mounted in bearings 85 of bearing brackets 86 and slidably secured to the members 14 and 15 by bolts 87 and 88 extending through slots (not shown) in the horizontal portions of said members. The forwardly extending arms 55 of the A-frame 54 are provided with openings (not shown) through which the bolts 87 extend to secure the A-frame to the bearing brackets 86 so that the A-frame, pressure roller 70 and emery wheel 83 move as a unit and are resiliently held against the brake shoe as it passes through the machine by tension of the springs 77.

The emery wheel 83 is operated from a motor 89 having a shaft 90 upon which a pulley 91 is mounted for operating belts 92 running over small pulleys 93 mounted on a shaft 94 which in turn is mounted in bearings (not shown) carried by the upright member 95 and the sides of an inclined chute 96 having its forward end terminating underneath the shoe wheel 16 and its lower end secured between the upright members 3 and 4, as best illustrated in Figs. 1 and 2. Mounted on the shaft 94 is a large pulley 97 having belt connection 98 with a small pulley 99 mounted upon the emery wheel shaft 84 having one end engaged in a bearing housing 100 of a bracket 101 mounted upon a cross member 102 and is connected at the other end with the emery wheel 83.

The operation of apparatus assembled as described is as follows:

The brake shoe 67 with the lining thereon is mounted on the shoe wheel or drum 16 at the front of the apparatus with the flange 67a engaging in the space 21' between the wheels of the drum and said flange has an opening 103 therein and the drum 16 comprising the plate members 17 and 18 are provided with inwardly extending grooves 104 for receiving a pin 105 which extends through the flange of the brake shoe to retain the brake shoe on the wheel as it travels through the machine. The shoe wheel 16 travelling very slowly will cause the forward end of the lining on the shoe to be engaged by the cutting edge 109 of the knife 108 to remove said lining and substantially all of the bonding material therefrom as the wheel carries the shoe past the knife. The tension of the springs 77 will hold the pressure wheel 70 resiliently against the shoe as it rotates on the shoe wheel 16. As the knife approaches the rear portion of the shoe, the forward end of the shoe from which the lining has been removed is engaged by the resiliently mounted emery wheel 83 which is moved back to receive said shoe by the action of the pressure wheel 70 and frame 56 and removes the remainder of the bonding material therefrom and leaves a smooth surface on the shoe. The shoe following the wheel around engages the roller 82 which retains the shoe on the wheel until it passes such wheel whereby the pin 105 will be disengaged by the weight of the shoe from the inwardly extending grooves 104 in the wheel and the shoe and pin will drop into the inclined chute 96 and slide downwardly therefrom to a container (not shown).

The emery wheel and shoe wheel both operate in the same direction and the grinding from the emery wheel will fly upwardly and may be removed through a tube 110 having its nozzle 111 located immediately above the emery wheel and be removed therefrom by air from a source of supply (not shown).

In normal operation of the machine a supply of shoes may be made available as desired as well as a plurality of pins for holding the shoes on the wheel.

It will be obvious from the foregoing that I have provided an improved apparatus for removing linings from brake shoes which have been secured thereon by a bonding material.

Brake shoes are of different size, but it will be obvious that the frame of the present invention may be extended to support drums of different size in tandem for accommodating different size brake shoes without departing from the spirit of the present invention.

What I claim and desire to secure by Letters Patent is:

1. Apparatus for removing the lining from a brake shoe applied thereto by a bonding material comprising, a main frame, a brake shoe drum mounted on said frame, means for rotating said drum, horizontally extending parallel bars supported above the main frame, a knife rigidly mounted on said parallel bars, said knife having a cutting edge extending toward said drum for engaging said lining, a second frame slidably mounted on the main frame underneath said parallel bars and adjacent said drum, a roller on said parallel bars, means resiliently mounting said roller on said bars for urging said roller against said shoe and exerting pressure thereon, a roller carried by said second frame for engaging the side of said drum for exerting pressure on said shoe as it passes said knife, means on said drum cooperating with means on said shoe for retaining said brake shoe thereon whereby rotation of the drum passes said shoe in contact with the cutting edge of said knife to remove the lining therefrom, and spring means connected to said second frame for urging said last-named roller in contact with said shoe on said drum.

2. Apparatus for removing the lining from a brake shoe applied thereto by a bonding material comprising, a main frame having upright corner members and connecting tie members at the top and bottom of the frame, spaced angle members extending longitudinally of said frame at substantially the center thereof, a second frame having longitudinal members parallel with and spaced above the spaced angle members, a brake shoe drum mounted on said spaced angle members near one end of the frame, a knife rigidly mounted on the second frame, said knife having a cutting edge extending toward said drum for engaging said lining, A-frame members slidably mounted between said angle members and the longitudinal members of the second frame, said A-frames having forwardly extending arms at their upper and lower portions, a plate extending between the longitudinal arms of said second frame and rigidly secured thereto, brackets having bearings slidably mounted on the underneath side of said plate and having connection with the upper arms of the A-frames, a roller having a shaft mounted in said bearings adjacent said drum, a plate slidable on the first named plate and secured to said upper forwardly extending arms of the A-frames and slidably secured to said first named brackets, springs having one end secured to the longitudinal members of the second frame and their other ends secured to said last named plate whereby said first named roller is spring urged toward said drum, a roller on top of said longitudinal members of the second frame above said drum for engaging the shoe as it engages said knife, means mounting said roller on said longitudinal members including spring means for urging said roller against said shoe on said drum, means on said drum cooperating with means on said shoe for retaining said brake shoe thereon, and means for rotating said drum whereby said shoe mounted thereon passes in contact with the cutting edge of said knife to remove the lining therefrom.

References Cited in the file of this patent

UNITED STATES PATENTS

| | | |
|---|---|---|
| 442,399 | Safford | Dec. 9, 1890 |
| 492,099 | Nelson | Feb. 21, 1893 |
| 1,609,514 | Kimmerling | Dec. 7, 1926 |
| 1,624,913 | Ames | Apr. 19, 1927 |
| 1,879,164 | French | Sept. 27, 1932 |
| 1,881,629 | Homan | Oct. 11, 1932 |
| 1,952,130 | Harrison et al. | Mar. 27, 1934 |
| 2,164,709 | Hall et al. | July 4, 1939 |
| 2,170,672 | Anderson | Aug. 22, 1939 |
| 2,258,378 | Collmann | Oct. 7, 1941 |
| 2,574,640 | Harper et al. | Nov. 13, 1951 |
| 2,630,176 | Kelley et al. | Mar. 3, 1953 |
| 2,674,309 | Bigelow | Apr. 6, 1954 |

FOREIGN PATENTS

| | | |
|---|---|---|
| 474,393 | Great Britain | Nov. 1, 1937 |